(12) United States Patent
Gao et al.

(10) Patent No.: US 10,139,867 B2
(45) Date of Patent: Nov. 27, 2018

(54) ELECTRONIC DEVICE

(71) Applicant: Lenovo (Beijing) Co., Ltd., Haidian District, Beijing (CN)

(72) Inventors: Zhijun Gao, Beijing (CN); Shipeng Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/757,778

(22) Filed: Dec. 23, 2015

(65) Prior Publication Data

US 2017/0090524 A1 Mar. 30, 2017

(30) Foreign Application Priority Data

Sep. 30, 2015 (CN) .......................... 2015 1 0640046

(51) Int. Cl.
*G06F 1/16* (2006.01)
*H01R 27/02* (2006.01)

(52) U.S. Cl.
CPC ........... *G06F 1/1683* (2013.01); *H01R 27/02* (2013.01)

(58) Field of Classification Search
CPC .................................................. G06F 1/1683
See application file for complete search history.

(56) References Cited

U.S. PATENT DOCUMENTS

| | | | | |
|---|---|---|---|---|
| 5,032,086 A * | 7/1991 | Skowronski | ......... | H01R 25/162 174/88 R |
| 5,205,017 A * | 4/1993 | Wang | ...... | G06F 1/162 16/366 |
| 5,518,418 A * | 5/1996 | Larabell | ......... | G11B 33/122 439/218 |
| 5,704,792 A * | 1/1998 | Sobhani | ......... | H01R 39/64 439/21 |
| 6,195,254 B1 * | 2/2001 | Chang | ......... | G06F 1/1616 248/917 |
| 9,319,110 B2 * | 4/2016 | Kopychev | ......... | H04B 5/0075 |
| 2001/0048587 A1 * | 12/2001 | Yim | ......... | G06F 1/1616 361/679.21 |
| 2002/0019157 A1 * | 2/2002 | Oguma | ......... | H01R 35/025 439/164 |
| 2002/0112320 A1 * | 8/2002 | Hayashi | ......... | B60R 16/0207 16/386 |

(Continued)

FOREIGN PATENT DOCUMENTS

| CN | 101657779 A | 2/2010 |
|---|---|---|
| CN | 103207645 A | 7/2013 |

OTHER PUBLICATIONS

First Office Action (13 pages including English translation) dated Mar. 28, 2018 out of Chinese priority Application No. 2015106400464.

*Primary Examiner* — Hoa C Nguyen
*Assistant Examiner* — Christopher L Augustin
(74) *Attorney, Agent, or Firm* — Brinks Gilson & Lione; John C. Freeman

(57) ABSTRACT

An electronic device is described that includes a first body; a second body; and a connection member through which the first body is connected with the second body. The connection member includes a rotary connection part for supporting the first body to rotate around an axis line of the rotary connection part and an extensible connection part for supporting the first body to be close to or away from the second body.

9 Claims, 5 Drawing Sheets

(56) References Cited

U.S. PATENT DOCUMENTS

| | | | | |
|---|---|---|---|---|
| 2005/0132536 A1* | 6/2005 | Hashizume | ............ | G06F 1/1616 |
| | | | | 16/386 |
| 2005/0268429 A1* | 12/2005 | Akiyama | ................ | G06F 1/162 |
| | | | | 16/221 |
| 2005/0282420 A1* | 12/2005 | Lee | ..................... | H04M 1/0216 |
| | | | | 439/165 |
| 2010/0243314 A1* | 9/2010 | Bryla | .................. | E05D 11/0081 |
| | | | | 174/651 |
| 2011/0237090 A1* | 9/2011 | Ehrlich | ................ | B60Q 1/0088 |
| | | | | 439/36 |
| 2013/0182403 A1* | 7/2013 | Yang | ..................... | G06F 1/1681 |
| | | | | 361/809 |
| 2013/0343706 A1* | 12/2013 | Droesbeke | ............ | G02B 6/4478 |
| | | | | 385/76 |
| 2014/0063710 A1* | 3/2014 | Myung | ................ | H05K 5/0017 |
| | | | | 361/679.4 |
| 2014/0168928 A1* | 6/2014 | Lee | ......................... | H01R 35/02 |
| | | | | 361/809 |
| 2014/0285960 A1* | 9/2014 | Sharma | ................. | G06F 1/1654 |
| | | | | 361/679.28 |

* cited by examiner

ELECTRONIC DEVICE

This application claims priority to Chinese Patent Application No. 201510640046.4 filed Sep. 30, 2015, the entire contents of which are incorporated herein by reference.

The present disclosure relates to the field of terminal devices, and more particularly, to an electronic device.

BACKGROUND

At present, when an electronic device (such as a mobile phone, a tablet, or the like) with a rotatable camera is rotating, the rotation angle is commonly limited. Since the wiring connecting the rotatable part with the body part continuously tends to tighten along with the increase of the rotation angle, if the rotation keeps in the same direction without reset, the wiring will be frayed and even be twisted off, and it will cause damage to the electronic device. Therefore, the user can only rotate the camera in a certain scope of angle, which deteriorates the user experience.

SUMMARY

In view of the above, the present disclosure desires to provide an electronic device, which can solve the problem in the art that the rotation angle is limited and the wiring harness in the rotation shaft is easily damaged during rotation, and improve the user experience.

To achieve the above object, the technical solutions of the present disclosure are implemented as below.

The disclosure provides an electronic device, and the electronic device comprises:
a first body;
a second body;
a connection member for connecting the first body with the second body;
the connection member comprises:
a first pivot part for pivotally connecting to the first body;
a second pivot part for pivotally connecting to the second body; and
an electrical connection unit for adapting to the first pivot part and the second pivot part and electrically connecting the first body with the second body through the first pivot part and the second pivot part.

In the above solution, the connection member connects a first wiring harness group disposed in the first body with a second wiring harness group disposed in the second body by the electrical connection unit.

In the above solution, the first pivot part is used to fix the first wiring harness group and the second pivot part is used to fix the second wiring harness group, and the number of wirings in the first wiring harness group may be the same as or different from that in the second wiring harness group.

In the above solution, the electrical connection unit comprises:
a first electrical connection unit having a first electrical conductor group, the first electrical conductor group comprising M electrical conductors, and the first electrical connection unit being connected with the first wiring harness group by the first electrical conductor group; wherein, M is a positive integer;
a second electrical connection unit having a second electrical conductor group, the second electrical conductor group comprising N electrical conductors, and the second electrical connection unit being connected with the second wiring harness group by the second electrical conductor group; wherein, N is a positive integer.

In the above solution, the electrical connection unit further comprises: an elastic component for applying pressure to the first electrical connection unit and the second electrical connection unit, so that the first electrical connection unit and the second electrical connection unit keep a stable position relationship in a first direction and the first electrical connection unit and the second electrical connection unit electrically connect with each other.

In the above solution, the electrical conductors in the first electrical conductor group are insulated with each other, and the electrical conductors in the second electrical conductor group are insulated with each other.

In the above solution, the electrical conductor is a metal ring.

In the above solution, the first body is movable with respect to the second body via the connection member; during a movement between the first body and the second body, a relative position between the first pivot part and the first body keeps unchanged, a relative position between the second pivot part and the second body keeps unchanged, the first electrical connection unit and the second electrical connection unit operatively keep relative movement in a second direction; wherein, during the relative movement in the second direction between the first and second electrical connection units, the first wiring harness group in the first body keeps an electrical connection with the second wiring harness group in the second body.

In the above solution, during the movement between the first body and the second body, the electrical conductors in the first electrical conductor group keep constant contact with an end of the first wiring harness group fixed by the first pivot part, and the electrical conductors in the second electrical conductor group keep constant contact with an end of the second wiring harness group fixed by the second pivot part.

In the above solution, the ends of the individual wirings in the first wiring harness group constantly connect with the same or different electrical conductors in the first electrical conductor group respectively; and the ends of the individual wirings in the second wiring harness group constantly connect with the same or different electrical conductors in the second electrical conductor group respectively.

Adopting the technical solutions according to the present disclosure, the first body can rotate with respect to the second body without limit, which solves the problem in the art that the rotation angle is limited and the wiring harness in the rotation shaft is easily damaged during rotation, and improves the user experience.

DETAILED DESCRIPTION

Hereinafter, the technical solutions of the present disclosure will be further described in detail with reference to the accompanying drawings and the specific embodiments. The accompanying drawings are only illustrative and do not intend to limit the disclosure.

First Embodiment

Figure 1:
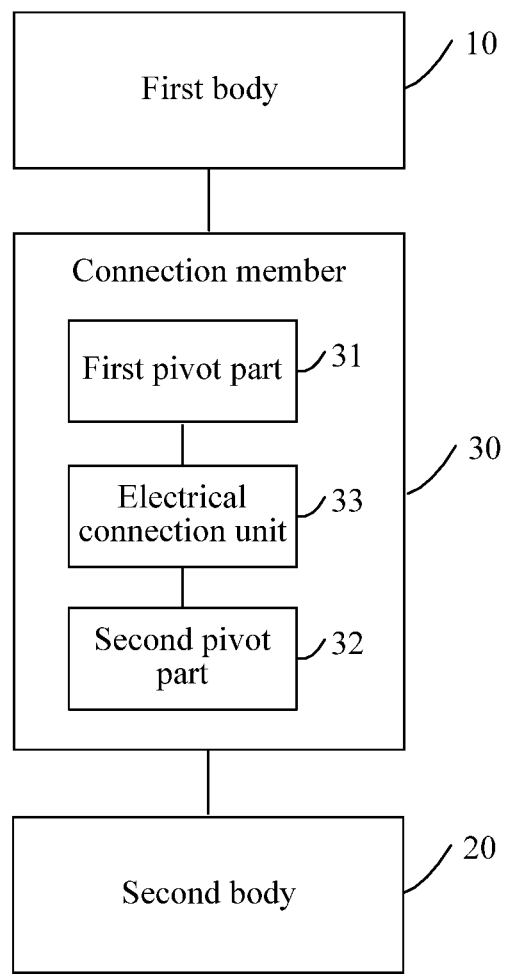
FIG. 1 is a structural schematic diagram of the electronic device according to an embodiment of the present disclosure.

The disclosure provides an electronic device and FIG. 1 is a structural schematic diagram of the electronic device according to an embodiment of the present disclosure. As shown in FIG. 1, the electronic device comprises:

a first body 10;

a second body 20;

a connection member 30 for connecting the first body 10 with the second body 20;

the connection member 30 comprises:

a first pivot part 31 for pivotally connecting to the first body 10;

a second pivot part 32 for pivotally connecting to the second body 20; and an electrical connection unit 33 for adapting to the first pivot part 31 and the second pivot part 32 and electrically connecting the first body 10 with the second body 20 through the first pivot part 31 and the second pivot part 32.

In the above solution, the connection member 30 connects a first wiring harness group disposed in the first body 10 with a second wiring harness group disposed in the second body 20 by the electrical connection unit 33.

In the above solution, the first pivot part 31 is used to fix the first wiring harness group and the second pivot part 32 is used to fix the second wiring harness group.

It should be noted that the number of wirings in the first wiring harness group may be the same as or different from that in the second wiring harness group.

Figure 2:
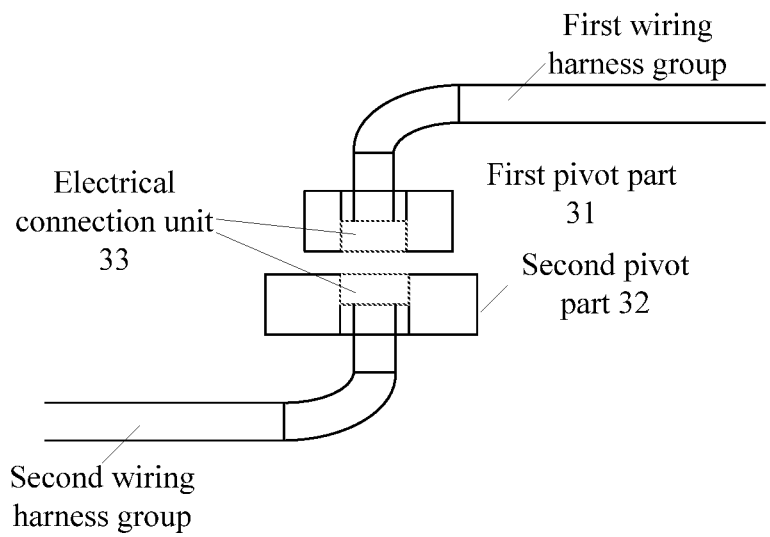
FIG. 2 is a schematic diagram of the wiring harnesses in the connection member according to an embodiment of the present disclosure.

FIG. 2 is a schematic diagram of the wiring harnesses in the connection member according to an embodiment of the present disclosure. As can be seen from FIG. 2, the wiring harnesses in the first wiring harness group disposed in the first body are disconnected from the wiring harnesses in the second wiring harness group disposed in the second body. The first pivot part 31 in the first connection member 30 is used to fix the first wiring harness group a in the first body and the second pivot part 32 in the first connection member 30 is used to fix the second wiring harness group b in the second body. The electrical connection unit 33 in the first connection member 30 is adaptive to the first pivot part 31 and the second pivot part 32 and electrically connects the first body 10 with the second body 20 through the first pivot part 31 and the second pivot part 32.

In the electronic device according to the embodiment, since the wiring harnesses in the first wiring harness group disposed in the first body 10 are disconnected from the wiring harnesses in the second wiring harness group disposed in the second body 20, the first body 10 can rotate with respect to the second body 20 without limit, and no matter how large the rotation angle of the first body 10 with respect to the second body 20 is, the problem in the art that the wiring harness is twisted off when the rotation angle is large due to the direct contact of the wiring harnesses in the first body and the second body will not occur, which greatly improves the user experience.

Second Embodiment

Figure 3:
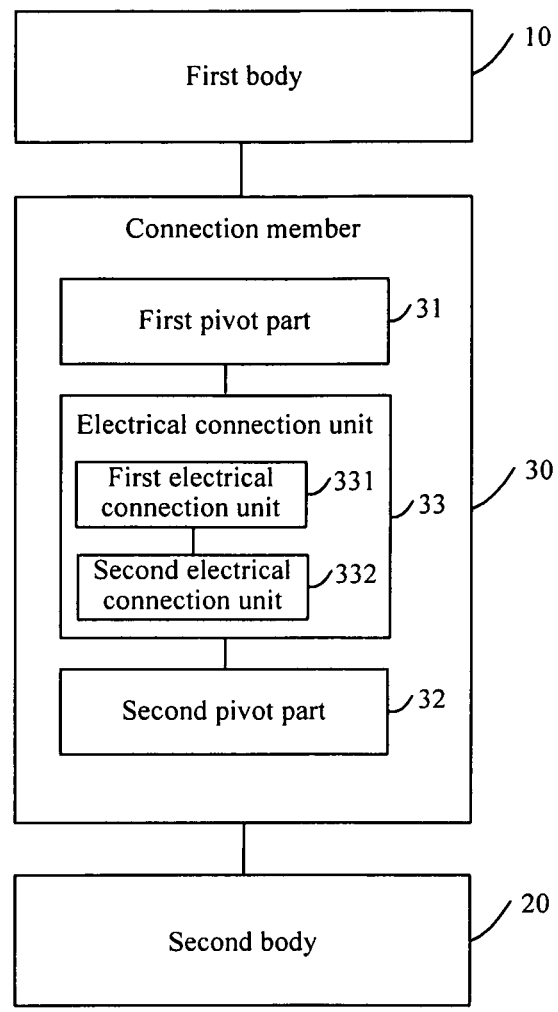
FIG. 3 is structural schematic diagram of another electronic device according to an embodiment of the present disclosure.

The disclosure provides an electronic device and FIG. 3 is a structural schematic diagram of another electronic device according to an embodiment of the present disclosure. As shown in FIG. 3, the electronic device comprises:

a first body 10;

a second body 20;

a connection member 30 for connecting the first body 10 with the second body 20;

the connection member 30 comprises:

a first pivot part 31 for pivotally connecting to the first body 10;

a second pivot part 32 for pivotally connecting to the second body 20; and an electrical connection unit 33 for adapting to the first pivot part 31 and the second pivot part 32 and electrically connecting the first body 10 with the second body 20 through the first pivot part 31 and the second pivot part 32.

In the above solution, the connection member 30 connects a first wiring harness group disposed in the first body 10 with a second wiring harness group disposed in the second body 20 by the electrical connection unit 33.

The electrical connection unit 33 comprises:

a first electrical connection unit 331 having a first electrical conductor group 3311, the first electrical conductor group 3311 comprising M electrical conductors, and the first electrical connection unit 331 being connected with the first wiring harness group by the first electrical conductor group 3311; wherein, M is a positive integer;

a second electrical connection unit 332 having a second electrical conductor group 3321, the second electrical conductor group 3321 comprising N electrical conductors, and the second electrical connection unit 332 being connected with the second wiring harness group by the second electrical conductor group 3321; wherein, N is a positive integer.

In the embodiment, the electrical conductor may be a metal ring.

The electrical conductors in the first electrical conductor group 3311 are insulated with each other, and the electrical conductors in the second electrical conductor group 3321 are insulated with each other.

Herein, M and N may be the same or different.

That is, the number of the electrical conductors contained in the first electrical conductor group 3311 and the number of the electrical conductors contained in the second electrical conductor group 3321 may be the same or different.

In the above solution, the electrical connection unit 33 can be construed as an electric brush structure, the first electrical connection unit 331 and the second electrical connection unit 332 can be construed as two parts in the electric brush structure. The first electrical connection unit 331 and the second electrical connection unit 332 both can move in the plane where it is located, and the first wiring harness group in the first body 10 and the second wiring harness group in the second body 20 can be connected with each other using the working principle of the electric brush.

In the electric device according to the embodiment of the present disclosure, since the wiring harnesses in the first wiring harness group disposed in the first body 10 are disconnected from the wiring harnesses in the second wiring harness group disposed in the second body 20, the first body 10 can rotate with respect to the second body 20 without limit, and the signal communication between the first body 10 and the second body 20 can be implemented by the relative movement between the first electrical connection unit 331 and the second electrical connection unit 332, since the first electrical connection unit 331 and the second electrical connection unit 332 can be regarded as the two parts of the electric brush structure. By incorporating the electric brush into the connection member 30, the user can rotate clockwise/anticlockwise without limit, which will not cause any damage to the wiring harnesses in the first wiring harness group and the second wiring harness group and improve the user experience.

Third Embodiment

Figure 4:
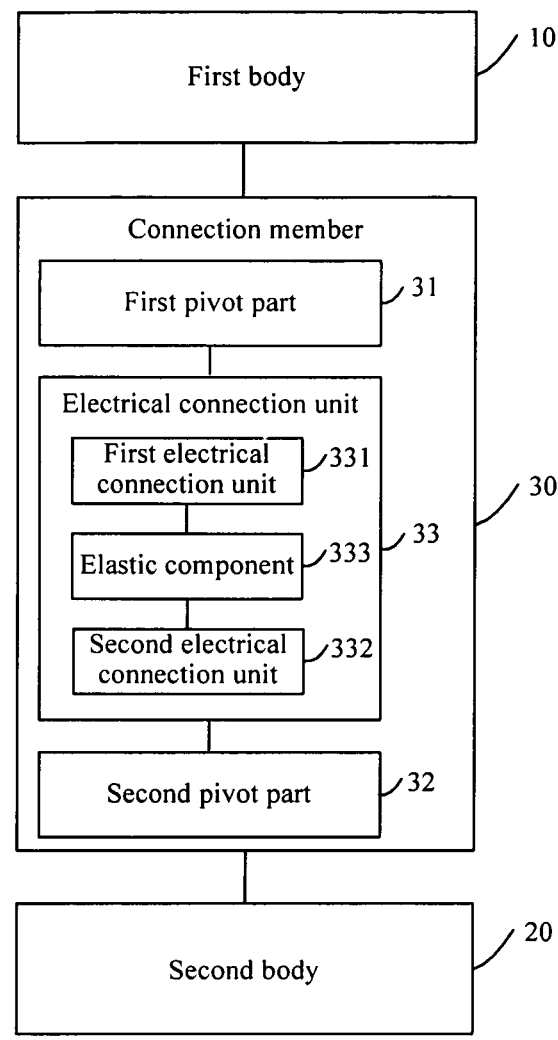
FIG. 4 is structural schematic diagram of yet another electronic device according to an embodiment of the present disclosure.

The disclosure provides an electronic device and FIG. 4 is a structural schematic diagram of another electronic device according to an embodiment of the present disclosure. As shown in FIG. 4, the electronic device comprises:

a first body 10;

a second body 20;

a connection member 30 for connecting the first body 10 with the second body 20;

the connection member 30 comprises:

a first pivot part 31 for pivotally connecting to the first body 10;

a second pivot part 32 for pivotally connecting to the second body 20; and an electrical connection unit 33 for adapting to the first pivot part 31 and the second pivot part 32 and electrically connecting the first body 10 with the second body 20 through the first pivot part 31 and the second pivot part 32.

In the above solution, the connection member 30 connects a first wiring harness group disposed in the first body 10 with a second wiring harness group disposed in the second body 20 by the electrical connection unit 33.

The electrical connection unit 33 comprises:

a first electrical connection unit 331 having a first electrical conductor group 3311, the first electrical conductor group 3311 comprising M electrical conductors, and the first electrical connection unit 331 being connected with the first wiring harness group by the first electrical conductor group 3311; wherein, M is a positive integer;

a second electrical connection unit 332 having a second electrical conductor group 3321, the second electrical conductor group 3321 comprising N electrical conductors, and the second electrical connection unit 332 being connected with the second wiring harness group by the second electrical conductor group 3321; wherein, N is a positive integer;

an elastic component 333 for applying pressure to the first electrical connection unit 331 and the second electrical connection unit 332 so that the first electrical connection unit 331 and the second electrical connection unit 332 keep a stable position relationship in a first direction and the first electrical connection unit 331 and the second electrical connection unit 332 electrically connect with each other.

In an embodiment of the present disclosure, the first direction refers to a vertical direction.

That is, the vertical distance between the first electrical connection unit 331 and the second electrical connection unit 332 keeps constant.

Herein, M and N may be the same or different.

That is, the number of the electrical conductors contained in the first electrical conductor group 3311 and the number of the electrical conductors contained in the second electrical conductor group 3321 may be the same or different.

Figure 5:
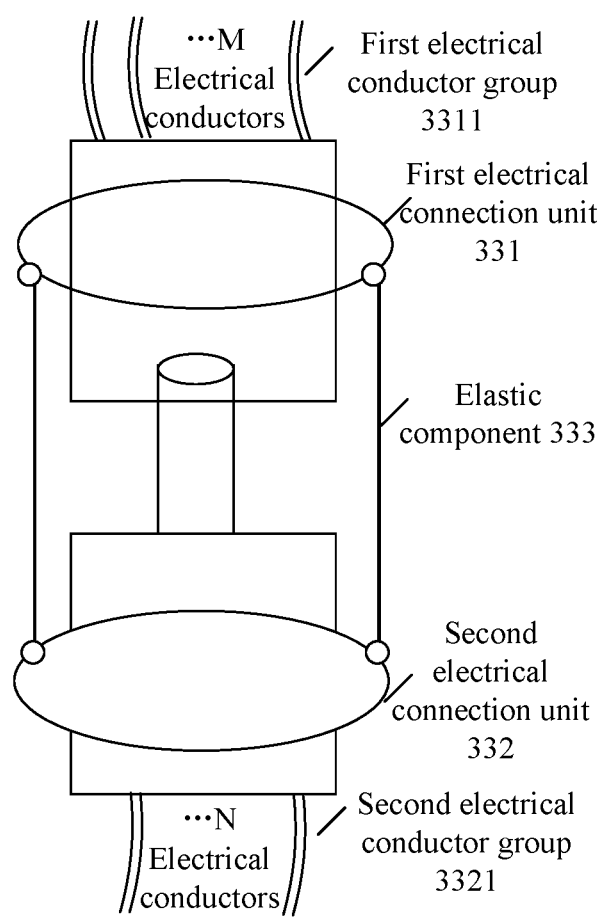
FIG. 5 is a structural schematic diagram of the connection member according to an embodiment of the present disclosure.
Figure 6:
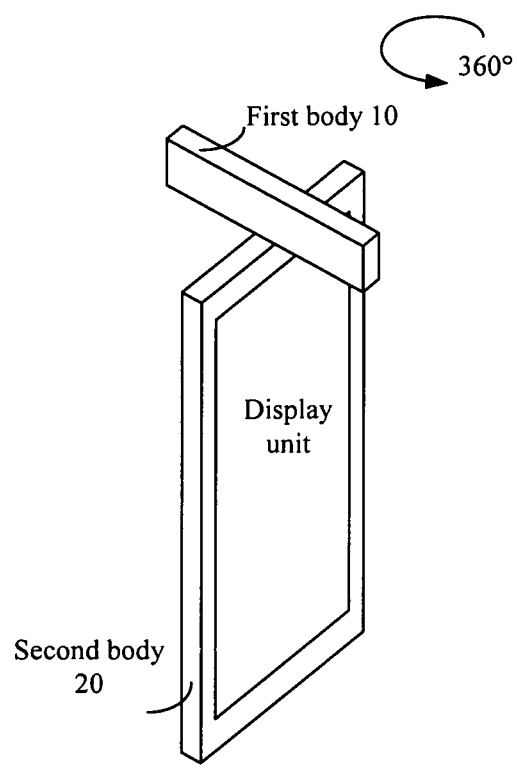
FIG. 6 is a schematic diagram illustrating the movement of the first body part around the second body part of the electronic device according to an embodiment of the present disclosure.

FIG. 5 is a structural schematic diagram of the connection member according to an embodiment of the present disclosure. As shown in FIG. 5, the first electrical connection unit 331 and the second electrical connection unit 332 keep the stable position relationship in the vertical direction by the elastic component 333; in the horizontal direction, the first electrical connection unit 331 and the second electrical connection unit 332 both can move in the plane where they are located so that the first electrical connection unit 331 and the second electrical connection unit 332 can move relatively in the horizontal direction.

What should be noted is that FIG. 5 is only a schematic diagram of the interior structure in the connection member, there are, of course, other connection ways in the connection member, which will not be described in detail herein.

In the above solution, the electrical connection unit 33 can be construed as an electric brush structure, the first electrical connection unit 331 and the second electrical connection unit 332 can be construed as two parts in the electric brush structure. The two parts can be connected by the elastic component 33, so that the first electrical connection unit 331 and the second electrical connection unit 332 can keep a stable position relationship in the vertical direction to enforce the structural stability of the connection member.

In the electronic device according to the embodiment, the first body 10 can rotate with respect to the second body 20 without limit, and no damage to the wiring harnesses in the first wiring harness group and the second wiring harness group will be caused due to the rotation, which greatly improves the user experience.

Fourth Embodiment

The disclosure provides an electronic device and the electronic device comprises:

a first body 10;

a second body 20;

a connection member 30 for connecting the first body 10 with the second body 20;

the connection member 30 comprises:

a first pivot part 31 for pivotally connecting to the first body 10;

a second pivot part 32 for pivotally connecting to the second body 20; and an electrical connection unit 33 for adapting to the first pivot part 31 and the second pivot part 32 and electrically connecting the first body 10 with the second body 20 through the first pivot part 31 and the second pivot part 32.

In the above solution, the connection member 30 connects a first wiring harness group disposed in the first body 10 with a second wiring harness group disposed in the second body 20 by the electrical connection unit 33.

In the above solution, the first pivot part 31 is used to fix the first wiring harness group and the second pivot part 32 is used to fix the second wiring harness group.

It should be noted that the number of wirings in the first wiring harness group may be the same as or different from that in the second wiring harness group.

It is easy to appreciate the case that the number of wirings in the first wiring harness group is the same as that in the second wiring harness group, the case that the number of wirings in the first wiring harness group is different from that in the second wiring harness group will be introduced as follows. Assuming there are six wirings in the first wiring harness group which are marked as A, B, C, D, E, and F, and there are five wirings in the second wiring harness group which are marked as a, b, c, d, and e; in the practical welding process, assuming that each wiring corresponds to each electrical conductor, that is, the wirings a, b, c, d, and e corresponds to electrical conductors 1', 2', 3', 4', and 5' in the second electrical conductor group respectively; correspondingly, the wirings A, B, C, D, E, and F should also corresponds to five electrical conductors 1, 2, 3, 4, and 5; that is, two of them connect to the same electrical conductor. For example, E and F are the wirings for converging the same type of signal, and E and F are welded to the electrical conductor 5' in the second electrical conductor group; the electrical conductors 1, 2, 3, 4, and 5 in the first electrical conductor group contact with the electrical conductors 1', 2', 3', 4', and 5' in the second electrical conductor group.

Wherein, the electrical connection unit 33 comprises:

a first electrical connection unit 331 having a first electrical conductor group 3311, the first electrical conductor group 3311 comprising M electrical conductors, and the first electrical connection unit 331 being connected with the first wiring harness group by the first electrical conductor group 3311; wherein, M is a positive integer;

a second electrical connection unit 332 having a second electrical conductor group 3321, the second electrical conductor group 3321 comprising N electrical conductors, and the second electrical connection unit 332 being connected with the second wiring harness group by the second electrical conductor group 3321; wherein, N is a positive integer;

an elastic component 333 for applying pressure to the first electrical connection unit 331 and the second electrical connection unit 332 so that the first electrical connection unit 331 and the second electrical connection unit 332 keep a stable position relationship in a first direction and the first electrical connection unit 331 and the second electrical connection unit 332 electrically connect with each other.

In an embodiment of the present disclosure, the first body 10 is movable with respect to the second body 20 via the connection member 30; during a movement between the first body and the second body, a relative position between the first pivot part 31 and the first body 10 keeps unchanged, a relative position between the second pivot part 32 and the second body 20 keeps unchanged, the first electrical connection unit 331 and the second electrical connection unit 332 operatively keep relative movement in a second direction. Wherein, during the relative movement in the second direction between the first and second electrical connection units, the first wiring harness group in the first body 10 keeps an electrical connection with the second wiring harness group in the second body 20.

In an embodiment of the present disclosure, the second direction is the horizontal direction.

That is, the first body 10, the first pivot part 31, the first wiring harness group, and the first electrical connection unit 331 can be regarded as a whole marked as "first entity"; during the movement, the position relationships among the four components in the "first entity" keep unchanged; for the same reason, the second body 20, the second pivot part 32, the second wiring harness group, and the second electrical connection unit 332 can also be regarded as a whole marked as "second entity"; during the movement, the position relationships among the four components in the "second entity" keep unchanged.

In an embodiment of the present disclosure, during the movement between the first body 10 and the second body 20, the electrical conductors in the first electrical conductor group 3311 keep contact with an end of the first wiring harness group fixed by the first pivot part 31, and the electrical conductors in the second electrical conductor group 3321 keep contact with an end of the second wiring harness group fixed by the second pivot part 32.

In the electronic device according to the embodiment, the first body 10 can rotate with respect to the second body 20 without limit, and no damage to the wiring harnesses in the first wiring harness group and the second wiring harness group will be caused due to the rotation, which greatly improves the user experience.

Fifth Embodiment

The disclosure provides an electronic device and the electronic device comprises:

a first body 10;

a second body 20;

a connection member 30 for connecting the first body 10 with the second body 20;

the connection member 30 comprises:

a first pivot part 31 for pivotally connecting to the first body 10;

a second pivot part 32 for pivotally connecting to the second body 20; and an electrical connection unit 33 for adapting to the first pivot part 31 and the second pivot part 32 and electrically connecting the first body 10 with the second body 20 through the first pivot part 31 and the second pivot part 32.

In the above solution, the connection member 30 connects a first wiring harness group disposed in the first body 10 with a second wiring harness group disposed in the second body 20 by the electrical connection unit 33.

Wherein, the electrical connection unit 33 comprises:

a first electrical connection unit 331 having a first electrical conductor group 3311, the first electrical conductor group 3311 comprising M electrical conductors, and the first electrical connection unit 331 being connected with the first wiring harness group by the first electrical conductor group 3311; wherein, M is a positive integer;

a second electrical connection unit 332 having a second electrical conductor group 3321, the second electrical conductor group 3321 comprising N electrical conductors, and the second electrical connection unit 332 being connected with the second wiring harness group by the second electrical conductor group 3321; wherein, N is a positive integer;

an elastic component 333 for applying pressure to the first electrical connection unit 331 and the second electrical connection unit 332, so that the first electrical connection unit 331 and the second electrical connection unit 332 keep a stable position relationship in a first direction and the first electrical connection unit 331 and the second electrical connection unit 332 electrically connect with each other.

In an embodiment of the present disclosure, the first body 10 is movable with respect to the second body 20 via the connection member 30; during a movement between the first body and the second body, a relative position between the first pivot part 31 and the first body 10 keeps unchanged, a relative position between the second pivot part 32 and the second body 20 keeps unchanged, the first electrical connection unit 331 and the second electrical connection unit 332 operatively keep relative movement in a second direction, and the first body 10 keeps an electrical connection with the second body 20.

In an embodiment of the present disclosure, the second direction is the horizontal direction.

In an embodiment of the present disclosure, the ends of the individual wirings in the first wiring harness group constantly connect with the same or different electrical conductors in the first electrical conductor group respectively; and the ends of the individual wirings in the second wiring harness group constantly connect with the same or different electrical conductors in the second electrical conductor group respectively.

For example, assuming there are wirings marked as A, B, C, D, and E in the first wiring harness group, and the first electrical conductor group in the first electrical connection unit comprises 10 electrical conductors marked as 1, 2, ... 9, and 10; when designing the product, if the wiring A is constantly connected with the electrical conductor 1, the wiring B is constantly connected with the electrical conductor 3, the wiring C is constantly connected with the electrical conductor 5, the wiring D is constantly connected with the electrical conductor 7, and the wiring E is constantly connected with the electrical conductor 9, no matter how to move during the movement between the first body and the second body, the relationships among the five wirings and the corresponding electrical conductors keep unchanged.

In an embodiment of the present disclosure, the manner for constant connection may be the welding method, the mechanical connection, or the like.

Sixth Embodiment

The disclosure provides an electronic device and the electronic device comprises:
a first body 10;
a second body 20;
a connection member 30 for connecting the first body 10 with the second body 20;
the connection member 30 comprises:
a first pivot part 31 for pivotally connecting to the first body 10;
a second pivot part 32 for pivotally connecting to the second body 20; and
an electrical connection unit 33 for adapting to the first pivot part 31 and the second pivot part 32 and electrically connecting the first body 10 with the second body 20 through the first pivot part 31 and the second pivot part 32.

In the above solution, the connection member 30 connects a first wiring harness group disposed in the first body 10 with a second wiring harness group disposed in the second body 20 by the electrical connection unit 33.

In an embodiment of the present disclosure, the first body 10 at least comprises a first functional unit.

Herein, the first functional unit could be a display unit, a communication unit, a control unit, or the like.

For example, there is an image acquisition unit 11 disposed in the first body 10; the second body 20 comprises a display unit 21; the image acquisition unit 11 is used to acquire an image which will be transferred to the display unit 21 to display it thereon. Since the first body 10 can perform a 360° movement with respect to the second body 20, the image acquisition unit 11 can acquire the images from different angles, which greatly improves the user experience.

In general, in the electronic device according to the embodiment, since the first body 10 can rotate with respect to the second body 20 without limit, no damage to the wiring harnesses in the first wiring harness group and the second wiring harness group will be caused due to the rotation, thus there will keep an excellent communication between the first body 10 and the second body 20. Furthermore, the functional units configured to implement the different functions are disposed in the first body, and the corresponding functions can be better implemented by the movement of the first body.

In the several embodiments provided by present application, it should be understood that the device/apparatus and methods disclosed therein may also be implemented by other manners. The above described device/apparatus embodiments are merely illustrative, for example, the unit division is only a logical function division, there may be other division manners in practical implementation, such as: a plurality of units or components may be combined or may be integrated into another system, or some features may be omitted or not executed. In addition, coupling, or direct coupling, or communicative connection between the shown or discussed respective components may be achieved through some interfaces, indirect coupling or communicative connection between devices or units may be electrical, mechanical, or other forms.

Units described above as separate members may be or may not be physically separated, components showed as units may be or may not be physical units; they may be located at one place or distributed to a plurality of network cells; it is possible to select some or all of the units therein to achieve the purpose of solutions in the embodiments according to the actual needs.

Further, respective functional units in the embodiments of the present application may be all integrated in one processing unit and may also be separated as one unit each, or two or more units may also be integrated in one unit; the aforesaid integrated unit may be implemented in the form of hardware or in the form of hardware plus software functional unit.

As will be appreciated by those of ordinary skill in the art: all or part of the steps of the above method embodiments may be completed by instructing relevant hardware through programs, these programs may be stored in a computer readable storage medium, the steps comprised in the above method embodiments will be executed when the programs are executed; the aforesaid storage medium comprises various mediums capable of storing program codes like a mobile storage device, a Read Only Memory (ROM), a magnetic disk, or an optical disk.

The above described are merely specific implementations of the present application, however, the protection scope of the present application is limited thereto, modifications or replacements that are easily conceivable for those skilled in the art within the technique range disclosed in the present application should all fall into the protection scope of the present application. Therefore, the protection scope of the present application should be based on what is claimed in the claims

The invention claimed is:
1. An electronic device, comprising:
a first body;
a second body;
a connection member for connecting the first body with the second body;
wherein the connection member comprises:
a first pivot part for pivotally connecting to the first body;
a second pivot part for pivotally connecting to the second body; and
an electrical connection unit for adapting to the first pivot part and the second pivot part and electrically connecting the first body with the second body through the first pivot part and the second pivot part; and,
wherein the connection member connects a first wiring harness group disposed in the first body with a second wiring harness group disposed in the second body by the electrical connection unit, and wiring harnesses in the first wiring harness group do not directly contact to wiring harnesses in the second wiring harness group, a number of wirings in the first wiring harness group differs from a number of wirings in the second wiring harness group, and wherein the first body is movable with respect to the second body via the connection member, and the first body can perform a 360° movement with respect to the second body.

2. The electronic device according to claim 1, wherein the first pivot part is used to fix the first wiring harness group and the second pivot part is used to fix the second wiring harness group.

3. The electronic device according to claim 1, wherein the electrical connection unit comprises:
   a first electrical connection unit having a first electrical conductor group that comprises M electrical conductors, and the first electrical connection unit being connected with the first wiring harness group by the first electrical conductor group; wherein, M is a positive integer;
   a second electrical connection unit having a second electrical conductor group that comprises N electrical conductors, and the second electrical connection unit being connected with the second wiring harness group by the second electrical conductor group; wherein, N is a positive integer.

4. The electronic device according to claim 3, wherein the electrical connection unit further comprises an elastic component for applying pressure to the first electrical connection unit and the second electrical connection unit, so that the first electrical connection unit and the second electrical connection unit keep a stable position relationship in a first direction and the first electrical connection unit and the second electrical connection unit electrically connect with each other.

5. The electronic device according to claim 3, wherein the electrical conductors in the first electrical conductor group are insulated with each other, and the electrical conductors in the second electrical conductor group are insulated with each other.

6. The electronic device as claimed in claim 3, wherein each electrical conductor in the first electrical conductor group and the second electrical conductor group is a metal ring.

7. The electronic device as claimed in claim 3, wherein during a movement between the first body and the second body, a relative position between the first pivot part and the first body keeps unchanged, a relative position between the second pivot part and the second body keeps unchanged, the first electrical connection unit and the second electrical connection unit operatively keep relative movement in a second direction;
   wherein, during the relative movement in the second direction between the first and second electrical connection units, the first wiring harness group in the first body keeps an electrical connection with the second wiring harness group in the second body.

8. The electronic device as claimed in claim 7, wherein during the movement between the first body and the second body, the electrical conductors in the first electrical conductor group keep constant contact with an end of the first wiring harness group fixed by the first pivot part, and the electrical conductors in the second electrical conductor group keep constant contact with an end of the second wiring harness group fixed by the second pivot part.

9. The electronic device as claimed in claim 8, wherein the ends of the individual wirings in the first wiring harness group constantly connect with the same or different electrical conductors in the first electrical conductor group respectively; and the ends of the individual wirings in the second wiring harness group constantly connect with the same or different electrical conductors in the second electrical conductor group respectively.

\* \* \* \* \*